United States Patent Office 3,634,466
Patented Jan. 11, 1972

---

3,634,466
17,17-DIFLUORO-16-NITRIMINO STEROIDS, 17,17-DIFLUORO-16-KETO STEROIDS, AND 17,17-DIFLUORO - 16 - HYDROXY- AND ACETOXY STEROIDS
William C. Ripka, Wilmington, Del., assignor to E. I. du Pont de Nemours and Company, Wilmington, Del.
No Drawing. Filed Aug. 28, 1969, Ser. No. 853,922
Int. Cl. C07c *169/20, 169/22*
U.S. Cl. 260—397.3                17 Claims

ABSTRACT OF THE DISCLOSURE

New steroid compounds, which have antiandrogenic activity, of the formula

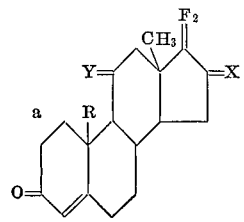

wherein R is hydrogen or methyl; X is the nitrimino group $=NNO_2$, oxygen, one hydrogen and one hydroxyl, or one hydrogen and one acetoxy group; Y is two hydrogen atoms, oxygen, or one hydrogen and one hydroxyl; and $a$ is either a single or a double bond; but $a$ cannot be a double bond unless R is methyl. A process for the preparation of 17,17-difluoro-16-ketosteroids is described.

BACKGROUND OF THE INVENTION

This invention relates to new 17,17-difluoro steroid compounds which have antiandrogenic activity.

Many fluorinated steroids have valuable physiological properties. For example, U.S. 3,347,878 describes 17,17-difluoro-4-estrene-3-one, and U.S. 3,378,550 describes related 17,17-difluoroandrostenes and their 11-hydroxy- and oxo-derivatives. All of these compounds are antiandrogens and some have other hormonal activities.

SUMMARY

The new compounds of this invention have the general formula

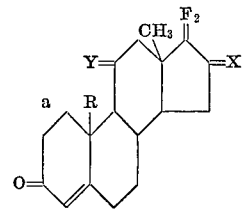

wherein R is hydrogen or methyl; X is the nitrimino group, oxygen, one hydrogen and one hydroxyl, or one hydrogen and one acetoxy group; Y is two hydrogen atoms, oxygen, or one hydrogen and one hydroxyl; and $a$ is either a single or a double bond; but $a$ cannot be a double bond unless R is methyl.

Because of their ready availability and quite high antiandrogenic activity, those steroids in which X is oxygen, Y is two hydrogen atoms, and $a$ is a single bond are preferred.

The new compounds of this invention are usually obtained by a reaction of a steroid having a 17-fluoro-$\Delta^{16}$ group with nitrosyl fluoride to give the corresponding 16-nitrimino-17,17-difluorosteroid, which on contact with neutral alumina containing a small amount of water gives the 16-keto-17,17-difluorosteroid. The reaction occurring on the D ring is illustrated by the following scheme:

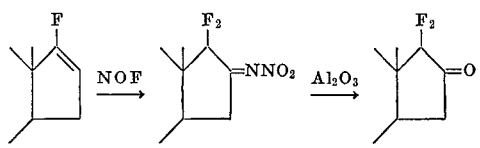

DETAILED DESCRIPTION OF THE INVENTION 17-fluoro-$\Delta^{16}$-steroids, which are the starting materials in the process of this invention, are known compounds. They can be made, for example, in the manner described in U.S. Patent 3,413,321 (to G. A. Boswell, Jr.) by dehydrofluorination of 17,17-difluorosteroids in the presence of anhydrous neutral alumina. The 17,17-difluorosteroids can be made by a reaction of 17-ketosteroids with sulfur tetrafluoride, as described in U.S. Patent 3,347,878.

The key step in the preparation of 17,17-difluoro-16-keto steroids, the reaction of a 17-fluoro-16-unsaturated steroid with nitrosyl fluoride, is carried out in solution in a solvent which dissolves steroids and is nonreactive with nitrosyl fluoride. Representative solvents include halogenated hydrocarbons of up to two carbons, such as methylene chloride, chloroform, carbon tetrachloride, fluorodichloromethane, and ethylene dichloride. The reaction preferably is carried out at room temperature, although temperatures of about 0–30° C. can be used. Pressures may be atmospheric or higher, as required to maintain a sufficient concentration of the reactants at the reaction temperature.

The intermediate steroidal nitrimine can be determined spectrometrically. It is unnecessary to isolate and purify the adduct. The solution containing the adduct is treated to remove excess nitrosyl fluoride and acidic reaction products, for example by treatment with an alkali bicarbonate. The adduct is then treated with chromatographic "neutral" alumina having 5–15% by weight of water (usually, activity grade III). This is best done by chromatography, eluting the desired 17,17-difluoro-16-keto steroid from the alumina with an appropriate solvent or solvent combination and purified by recrystallization.

The invention is illustrated by the following examples of certain preferred embodiments thereof.

Example I.—17,17-difluoro-16-nitrimino-4-estren-3-one and 17,17-difluoro-4-estren-3,16-dione

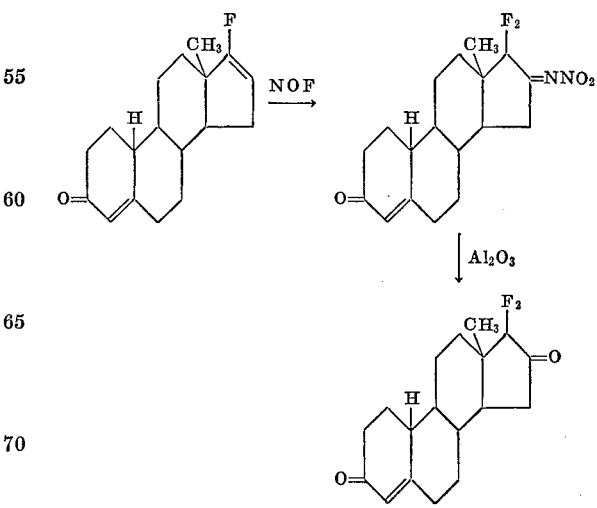

A solution of 4 g. of 17-fluoro-4,16-estradien-3-one (described in U.S. 3,413,321) in 100 ml. of methylene chloride was treated at 25° with 2 g. of nitrosyl fluoride for 1 hour. The solution was poured into water, and the methylene chloride layer was washed with water, saturated NaHCO$_3$ solution, water, and saturated NaCl solution; dried over Na$_2$SO$_4$; and concentrated by evaporation to give 17,17-difluoro-16-nitrimino - 4 - estren-3-one, characterized by infrared absorption at 6.1 and 6.4$\mu$, assigned to the C=N and NO$_2$ groups, respectively.

The oil thus obtained was chromatographed on 150 g. of alumina (activity III, water content about 6%) and eluted with hexane, and hexane/benzene mixtures to give 1 g. of 17,17-difluoro-4-estren-3,16-dione as white crystals, which were recrystallized from acetone/hexane; M.P. 162–164°;

$\alpha_D^{24}$ —179° (C. 1.07 CHCl$_3$); UV $\lambda_{max}^{EtOH}$: 310 m$\mu$ ($\epsilon$ 120), 292 m$\mu$ ($\epsilon$ 117), and 237 m$\mu$ ($\epsilon$ 16,600); IR $\lambda_{max}^{CHCl_3}$: 5.26$\mu$ (C$_{16}$=O), 6.0$\mu$ (C$_3$=O), and 6.2$\mu$ (C$_4$=C$_5$)

NMR(H$^1$):0.98 p.p.m. (H–18 doublet with J about 2 cps.), 5.88 p.p.m. (H–4).

*Analysis.*—Calc'd for C$_{18}$H$_{22}$O$_2$F$_2$ (percent): C, 10.10; H, 7.19; F, 12.32. Found (percent): C, 70.22; H, 7.28; F, 12.44.

Example 2.—17,17-difluoro-16-nitrimino-4-androsten-3-one and 17,17-difluoro-4-androsten-3,16-dione

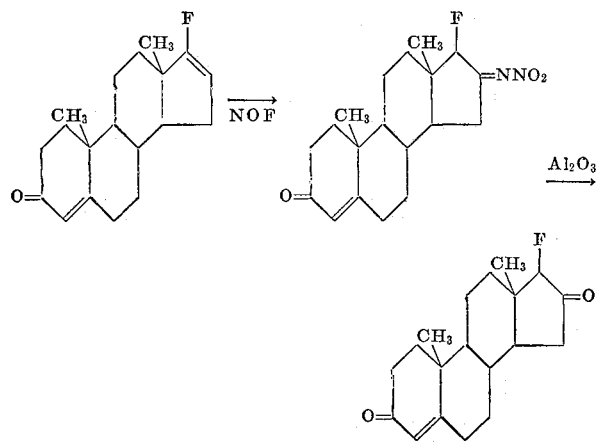

A mixture of 1.5 g. of 17-fluoro-4,16-androstadien-3-one (described in U.S. 3,413,321), 50 ml. of methylene chloride, 0.5 g. sodium fluoride and 8 g. of nitrosyl fluoride was allowed to react at room temperature for 16 hours. The reaction mixture was washed and concentrated as described in Example 1 for 17,17-difluoro-16-nitrimino-4-estren-3-one to give 17,17-difluoro-16-nitrimino-4-androsten-3-one. The product was chromatographed on alumina containing about 6% water and eluted with hexane and hexane/benzene mixtures) to yield 0.8 g. of crystalline 17,17-difluoro-4-androsten-3,16-dione of which a portion was sublimed for analysis, M.P. 156–159°;

$\alpha_D^{23}$ —147° (C. 1.06 CHCl$_3$); IR $\lambda_{max}^{Nujol}$: 5.65$\mu$ (C$_{16}$=O) 6.0$\mu$ (conjugated C$_3$=O), 6.2$\mu$ (C$_4$=C$_5$) and CF bands between 8—9$\mu$; IR $\lambda_{max}^{KBr}$: 5.65$\mu$, 5.98$\mu$, 6.18$\mu$, 7.26$\mu$ (CH$_3$); UV $\lambda_{max}^{EtOH}$: 315 m$\mu$ ($\epsilon$ 109), 238 m$\mu$ ($\epsilon$ 16,500)

NMR(H'): 0.98 p.p.m. (multiplet H–18), 1.25 p.p.m. (H–19), 5.8 p.p.m. (H–4).

*Analysis.*—Calc'd for C$_{19}$H$_{24}$O$_2$F$_2$ (percent): C, 70.78; H, 7.50; F, 11.78. Found (percent): C, 70.44; H, 7.29; F, 12.20.

Example 3.—17,17-difluoro - 16 - nitrimino-1,4-androstadien-3-one and 17,17-difluoro - 1,4 - androstadien-3,16-dione

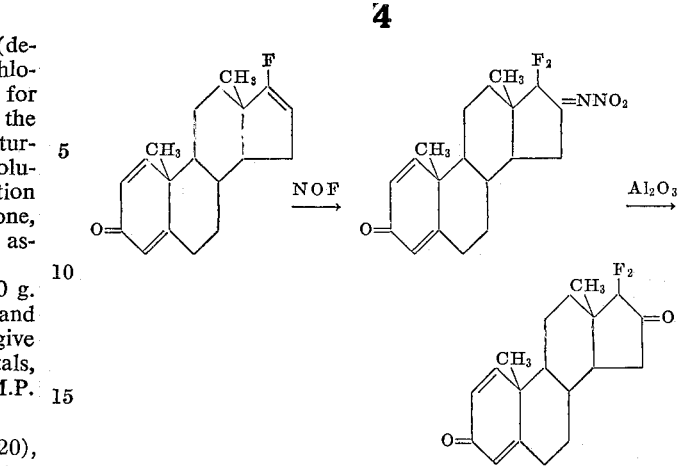

A solution of 2.531 g. of 17-fluoro-1,4,16-androstatrien-3-one (prepared from 17,17-difluoro-1,4-androstadien-3-one reported by Tadanier et al. J. Org. Chem. 26, 2436 (1961) by heating with anhydrous chromatographic alumina according to the procedure of U.S. 3,413,321) in 150 ml. of methylene chloride was allowed to react with 3 g. of nitrosyl fluoride and worked up according to the procedure of Example 2 to give 17,17-difluoro-16-nitrimino-1,4-androstadien-3-one which was chromatographed on alumina containing about 6% water and eluted with hexane and hexane/benzene mixtures to give 17,17-difluoro-1,4-androstadien-3,16-dione. Recrystallization of the latter from aceone/hexane gave 0.312 g., M.P. 174–175°;

UV $\lambda_{max}^{EtOH}$: 316 m$\mu$ ($\epsilon$ 95), 242 ($\epsilon$ 16,500); IR, $\lambda_{max}$ : 3.26$\mu$ (=CH), 5.59$\mu$ (C$_{16}$=O), 5.97$\mu$ (conjugated C$_3$=O), 6.12 and 6.20 (conjugated C=C)

NMR(H')CDCl$_3$: broad peaks at 7.3, 7.1, 7.0, 6.3 and 6.1 p.p.m., singlet at 1.28 p.p.m. (H–19), doublet J=2 cps. at 0.98 p.p.m. (H–18).

*Analysis.*—Calc'd for C$_{19}$H$_{22}$O$_2$F$_2$: MW 320.1586; C, 71.22%; H, 6.92%. Found: MW 320.1588; C, 71.32%; H, 6.88%. (MW by mass spectroscopy)

Example 4.—17,17-difluoro - 16 - nitrimino-4-androsten-3,11-dione and 17,17-difluoro - 4 - androsten-3,11,16-trione

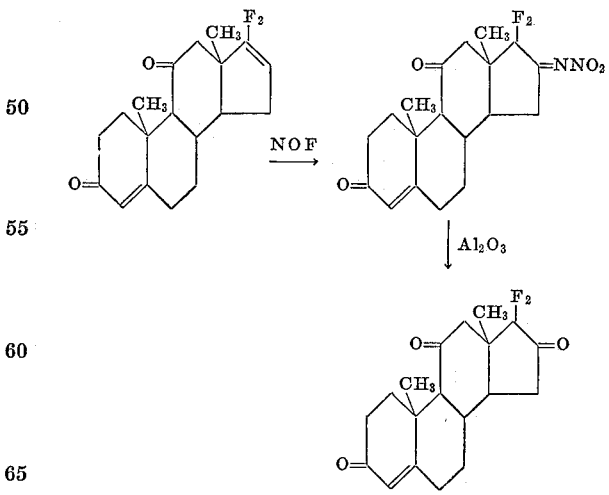

A mixture of 16 g. of 17,17-difluoro-4-androsten-3,11-dione (prepared as described in U.S. 3,257,424), 1000 ml. of xylene and 1500 g. of anhydrous alumina (activity grade I) was heated to reflux and allowed to stand 16 hours. It was filtered and the filtrate washed with 2 liters of ethanol/ethyl acetate. Chromatography on "Florisil" (trademark of Floridin Co.) magnesium silicate and elution with hexane/acetone mixtures gave 4.5 g. of 17-fluoro-4,16-androstadien-3,11-dione, M.P. 135–138°;

$\alpha_D^{240} +272°$ (C. 1.26 CHCl₃); UV $\lambda_{max}^{EtOH}$: 295 mμ (ε 169), 236 (ε 16,100)

*Analysis.*—Calc'd for C₁₉H₂₃O₂F (percent): C, 75.50; H, 7.67; F, 6.28. Found (percent): C, 75.17; H, 7.69; F, 6.52.

When the above compound is contacted with nitrosyl fluoride according to the procedure of the preceding examples, there is produced 17,17 - difluoro-16-nitrimino-4-androsten-3,11-dione, which is converted by chromatography on alumina containing 6% water to 17,17-difluoro-4-androsten-3,11,16-trione.

17,17-difluoro steroids of the formula

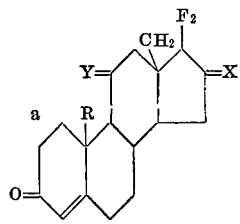

in which either one or both of X and Y are oxygen atoms can be converted to their corresponding β hydroxy- and β acetoxy derivatives. Thus the C-11 oxo group of the product of Example 4 is readily reduced to the β hydroxyl by the following reactions

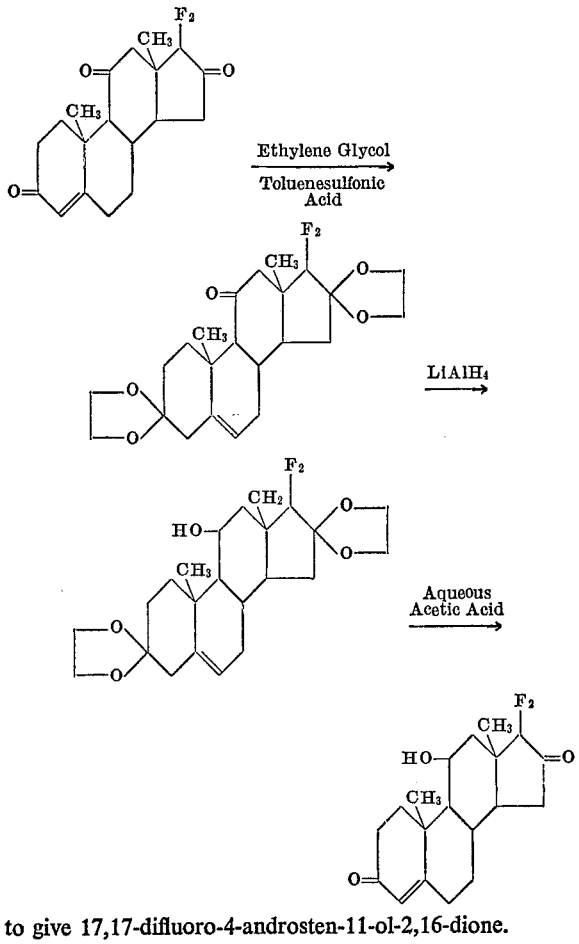

to give 17,17-difluoro-4-androsten-11-ol-2,16-dione.

β Hydroxy derivatives of C-16 oxo group also can be produced. Reaction of 17,17 - difluoro-4-androsten-3,16-dione, 17,17-difluoro-1,4-androstadien-3,16-dione or of 17,17-difluoro-4-estren-3,16-dione with one equivalent of sodium borohydride in ethanol at 0° yields the corresponding 16 - hydroxysteroids; i.e., 17,17-difluoro-4-androsten-16 - ol - 3 - one, 17,17 - difluoro-1,4-androstadien-16-ol-3 - one, or 17,17 - difluoro - 4 - estren-16-ol-3-one. Reaction of the latter hydroxy steroids with acetic anhydride yields the corresponding 16-ol acetates.

The new compounds of this invention have antiandrogen activity, i.e., they block the androgenic or virilizing action of testosterone. This can be shown by the chick comb assay. Day-old male white Leghorn chicks are used. On the first day the chicks are injected once with testosterone enanthate (0.5 mg./0.1 ml. sesame oil, subcutaneously). Beginning on the same day the test material (in 0.05 ml. sesame oil) is inuncted once daily for 7 days, with autopsy on day 8. Observation of the comb ratio of two sets of chicks shows the effectiveness of the new compounds. The results of these assays obtained with two selected compounds of the present invention are tabulated below.

TABLE

| Test compound | | Testosterone Enanthate, mg. | No. of chicks | Mean body weight | Mean comb ratio |
|---|---|---|---|---|---|
| Description | Dose, mg. | | | | |
| Control 1 | | | 10 | 79 | 0.57±0.5 |
| Control 2 | | 0.5 | 10 | 83 | 1.25±0.9 |
| Compound A | (¹) 2 | 0.5 | 10 | 81 | 1.08±0.5 |
| Compound B | (²) 2 | 0.5 | 10 | 79 | 1.10±0.6 |

¹ 17,17-Difluoro-4-estren-3,16-dione.
² 17,17-Difluoro-1,4-androstadien-3,16-dione.

Compound A inhibits the testosterone-induced comb formation by about 25%, and compound B by about 22%. Both results are comparable to those usually obtained with progesterone, which is accepted as a standard for comparing antiandrogenic agents useful in therapeutic treatment of prostatic disease.

The embodiments of the invention to which an exclusive property or privilege is claimed are defined as follows:

1. A compound of the formula

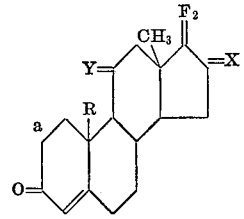

where R is selected from the group hydrogen and methyl; X is selected from the nitrimino group, oxygen, one hydrogen and one β hydroxyl, and one hydrogen and one β acetoxy group; Y is selected from the group two hydrogen atoms, oxygen, and one hydrogen and one β hydroxyl; and *a* is selected from the group a single bond and a double bond; providing that *a* cannot be a double bond unless R is methyl.

2. 17,17 - difluoro - 16 - nitrimino-4-estren-3-one, the compound of claim 1 wherein R is hydrogen; X is the nitrimino group; Y is two hydrogen atoms; and *a* is a single bond.

3. 17,17 - difluoro - 4 - estren - 3,16 - dione, the compound of claim 1 wherein R is hydrogen; X is oxygen; Y is two hydrogen atoms; and *a* is a single bond.

4. 17,17 - difluoro - 16 - nitrimino - 4 - androsten-3-one, the compound of claim 1 wherein R is methyl; X is the nitrimino group; Y is two hydrogen atoms; and *a* is a single bond.

5. 17,17 - difluoro - 4 - androsten - 3,16 - dione, the compound of claim 1 wherein R is methyl; X is oxygen; Y is two hydrogen atoms; and *a* is a single bond.

6. 17,17-difluoro-16-nitrimino - 1,4 - androstadien-3-one, the compound of claim 1 wherein R is methyl; X is the nitrimino group; Y is two hydrogen atoms; and a is a double bond.

7. 17,17-difluoro - 1,4 - androstadien-3,16-dione, the compound of claim 1 wherein R is methyl; X is oxygen; Y is two hydrogen atoms; and a is a double bond.

8. 17,17 - difluoro - 16 - nitrimino-4-androsten-3,11-dione, the compound of claim 1 wherein R is methyl; X is the nitrimino group; Y is oxygen; and a is a single bond.

9. 17,17 - difluoro - 4 - androsten-3,11,16-trione, the compound of claim 1 wherein R is methyl; X and Y each is oxygen; and a is a single bond.

10. 17,17 - difluoro - 4 - androsten-11-ol-3,16-dione, the compound of claim 1 wherein R is methyl; X is oxygen; Y is one hydrogen and one β hydroxyl group; and a is a single bond.

11. 17,17 - difluoro - 4 - androsten-16-ol-3-one, the compound of claim 1 wherein R is methyl; X is one hydrogen and one β hydroxyl group; Y is two hydrogen atoms; and a is a single bond.

12. 17,17 - difluoro-4-androsten-16-acetoxy-3-one, the compound of claim 1 wherein R is methyl; X is one hydrogen and one β acetoxy group; Y is two hydrogen atoms; and a is a single bond.

13. 17,17 - difluoro-1,4-androstadien-16-ol-3-one, the compound of claim 1 wherein R is methyl; X is one hydrogen and one β hydroxyl group; Y is two hydrogen atoms; and a is a double bond.

14. 17,17 - difluoro-1,4-androstadien - 16 - acetoxy-3-one, the compound of claim 1 wherein R is methyl; X is one hydrogen and one β acetoxy group; Y is two hydrogen atoms; and a is a double bond.

15. 17,17 - difluoro - 4 - estren-16-ol-3-one, the compound of claim 1 wherein R is hydrogen; X is one hydrogen and one β hydroxyl group; Y is two hydrogen atoms; and a is a single bond.

16. 17,17 - difluoro - 4 - estren-16-acetoxy-3-one, the compound of claim 1 wherein R is hydrogen; X is one hydrogen and one β acetoxy group; Y is two hydrogen atoms; and a is a single bond.

17. A process for the preparation of a 17,17-difluoro-16-ketosteroid, said process consisting essentially of the following sequential steps:
(a) contacting a solution of a 17-fluoro-$\Delta^{16}$-steroid in an inert solvent with nitrosyl fluoride at a temperature of about 0–30° C. to form the corresponding 17,17-difluoro-16-nitrimino steroid;
(b) neutralizing or removing excess nitrosyl fluoride and acidic reaction products; and
(c) contacting the solution of the 17,17-difluoro-16-nitriminosteroid with neutral alumina containing about 5–15% by weight of water.

References Cited

UNITED STATES PATENTS 3,320,291   5/1967   Andreades et al. ____ 260—397.4

HENRY A. FRENCH, Primary Examiner

U.S. Cl. X.R.

260—239.55 C, 397.4, 397.45